United States Patent
Toskala et al.

(10) Patent No.: US 6,678,249 B2
(45) Date of Patent: Jan. 13, 2004

(54) PHYSICAL LAYER PACKET RETRANSMISSION HANDLING WCDMA IN SOFT HANDOVER

(75) Inventors: Antti Toskala, Espoo (FI); Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/156,753

(22) Filed: May 24, 2002

(65) Prior Publication Data

US 2003/0152031 A1 Aug. 14, 2003

Related U.S. Application Data

(63) Continuation-in-part of application No. 10/076,863, filed on Feb. 14, 2002, now abandoned.

(51) Int. Cl.[7] .................................................. H04J 1/16
(52) U.S. Cl. ...................... 370/236; 370/331; 370/349; 370/394; 370/441; 714/749
(58) Field of Search ................... 370/349, 338, 370/394, 465, 320, 331, 335, 342, 441, 442, 328, 341; 714/748–749

(56) References Cited

U.S. PATENT DOCUMENTS

| | | | | | |
|---|---|---|---|---|---|
| 5,931,964 | A | * | 8/1999 | Beming et al. ............. | 714/748 |
| 6,381,458 | B1 | * | 4/2002 | Frodigh et al. ............. | 455/442 |
| 6,507,572 | B1 | * | 1/2003 | Kumar et al. ................ | 370/335 |
| 6,510,174 | B1 | * | 1/2003 | Sexton et al. ................ | 375/213 |
| 6,526,030 | B2 | * | 2/2003 | Rezaiifar et al. ............ | 370/335 |
| 6,542,490 | B1 | * | 4/2003 | Ahmadvand et al. ........ | 370/338 |

OTHER PUBLICATIONS

"Harmonized 1xEV–DV Reverse Link Solution", Lucent Technologies, Inc. C50–RL–20010523–xxx, May 23, 2001.

* cited by examiner

Primary Examiner—Dang Ton
Assistant Examiner—Inder P Mehra

(57) ABSTRACT

When employing HARQ in soft handover (SHO) in a mobile communication system, a mobile station in communication with multiple base stations is signaled by each of the base stations when a packet sent by the mobile station is correctly received. However, while one or more base stations may have received the transmission correctly, others may not have, and retransmission may be called for. To address the possibility of having to resend such a packet, the mobile station of the invention retransmits only if a selected number of the base stations received the transmission incorrectly and does not if at least one base station received the original transmission correctly. The mobile transmits at a rate selected according to a rule from data rate information or signaling received from one or more of the base stations. The network is then able to retrieve the packet from one or more of the base stations which have received it correctly and to supply it to another or others which have not.

11 Claims, 3 Drawing Sheets

MOBILE STATION

BASE STATION

SYSTEM

PHYSICAL LAYER PACKET RETRANSMISSION HANDLING WCDMA IN SOFT HANDOVER

CROSS-REFERENCE TO RELATED APPLICATION

The present application is a Continuation-In-Part of application Ser. No. 10/076,863, filed Feb. 14, 2002 now abandoned, entitled "Physical Layer Packet Retransmission Handling in WCDMA in Soft Handover" and from which priority is claimed under 35 USC 120.

BACKGROUND OF THE INVENTION

1. Technical Field

The present invention relates to automatic repeat request (ARQ) methods for high-speed data communications in a mobile communication system and, more particularly, for use on the uplink during a soft handover.

2. Discussion of Related Art

In a standard method of checking transmitted data, the sender encodes an error detection field based on the contents of the message. The receiver recalculates the check field and compares it with that received. If they match, an "ACK" (Acknowledgement) is transmitted to the sender. If they do not match, a "NACK" (Negative Acknowledgement) is returned, and the sender retransmits the message. Naturally, the sender at least temporarily stores the data it has sent until it is assured that the receiver has received it correctly. In the new third generation wireless system which employs code division multiple access, there will be high-speed data transfers using both circuit- and packet-switched data. For the noisy channels encountered in such systems, hybrid automatic repeat request schemes are contemplated for non-real time services. The above-described automatic repeat request (ARQ) idea is combined with forward error correction to arrive at hybrid ARQ (HARQ). Forward error correction (FEC) is a technique used by a receiver for correcting errors incurred in transmission without requiring retransmission. It typically involves a transmitter using a convolution algorithm to embed sufficient redundancy in the data block to allow the receiver to correct transmission errors.

There are different ways of implementing the automatic repeat request (ARQ) concept, but the selective-repeat continuous ARQ is probably going to be used in connection with FEC for third-generation wireless systems. There are several types of ARQ that can be used. For instance, Type I is defined as identifying an erroneous packet data unit and retransmitting an identical copy. The FEC coding rate is fixed, and there is no combining of earlier and later versions of the packet data unit. In Type II, the erroneous packet data unit that needs to be retransmitted is not discarded, but combined with some incremental redundancy that is provided by the transmitter for subsequent decoding. The retransmitted packets usually have higher coding rates than Type I and are combined at the receiver with the stored values. Type III is similar to Type II, except that every retransmitted packet is now self-decodable. In situations where the transmitted packet can be severely damaged due, for instance, to interference, it is better to have a scheme where retransmitted blocks are self-decodable.

In any event, in the third generation there is also a concept called soft handover, where a mobile station is connected at the same time to more than one base station, called "Node B" in the third generation. Since third generation is a code-division multiple access system, it differs from earlier generation time division multiple access systems, where a handover was a short procedure, and the normal state of affairs was a non-handover situation. In CDMA systems, the situation is quite different, in that a mobile station can spend a lot of time in handover, called a soft handover (SHO) state. Each separate link from a base station is called a soft-handover branch and, from the point of view of the mobile station, there is not much difference between being connected to one Node B or several Node Bs. The mobile station is prepared to receive numerous multi-path components of the same signal using its specialized receiver. Since all base stations use the same frequency in a soft handover, the mobile station considers the signals as simply multi-path components (except for being coded with different spreading codes).

All of the base stations involved in an SHO are designated as being in an "active set". When the signal strength of a base station transmission exceeds an "addition threshold" in the mobile station, the base station is added to the active set, and the mobile station enters into an SHO state, if not already there. A "drop threshold" prevents premature removal of base stations from the active set, i.e., it has a hysteresis effect because its value is always lower than the add threshold. A timer starts when the signal strength drops below the drop threshold, and the base station is removed from the active set if the timer expires. The network controls the values of these thresholds by communications with the mobile stations.

When in soft handover, with the mobile station communicating on multiple uplinks with multiple corresponding base stations, and when employing HARQ in such a communication, the base stations will be signaling to the mobile station on corresponding downlinks to inform it as to whether or not its transmissions have been correctly received or not. In such a case, one or more of the multiple base stations might have received the transmission from the mobile station correctly, while others may not. This can be a problem, since the contemplated high-speed services provided by third generation systems may be slowed down considerably if one of the base stations is able to hold up the successful transmission simply because it or more than one base station did not receive a particular transmission correctly, while one or more other base stations did receive a correct reception.

One way to address this problem, for instance in a case where there are two base stations in the active set, is to have the mobile station deem a transmission successful if either base station ACKs. See "Harmonized 1xEV-DV Reverse Link Solution," C50-RL-20010523-xxx, May 23, 2001 by Lucent Technologies, Inc. Either one or all active set base stations may schedule a mobile station in soft handover. For the scenario with one base station doing the scheduling (timing of sending a packet) as well as assigning rate, duration and packet size, it is assumed the mobile was being served by that base station alone before it moved into handoff. The other base station does not schedule the user even though it is in the mobile's active set. It however monitors the mobile's reverse channels. The mobile responds to the scheduling by transmitting a data packet at the granted time using the appropriate power, rate and duration indicated by the scheduling base station. Both base stations decode the packet and send an ACK or NACK as the case may be. The mobile deems the transmission successful if either base station ACKs. In the next transmission, the mobile sends a message to flush out the buffer of any base station that may have been unsuccessful in decoding the previous transmission. For a case of both stations scheduling independently, the mobile may for instance use the scheduling received from the first base station and ignore the other base station's schedule grant. Again, the mobile deems the transmission successful if for instance the first base station ACKs and the second NACKs. The next packet transmission of the mobile can be scheduled by either base station. The mobile sends a message to flush out the second base station's buffer during this transmission.

A problem with this approach is that as individual base stations make scheduling decisions, then for example two base stations can assign the maximum rate to two mobiles simultaneously even when those mobiles are connected both to these two base stations. Then both mobiles can transmit at the cell border (in soft handover) at full rate and probably both the transmissions will fail. On the other hand, if one base station sets the values very low, then data rates could remain too low, especially if the active set is large.

DISCLOSURE OF INVENTION

An object of the present invention is to overcome the above-described problem by setting forth a procedure for packet retransmission handling in mobile communication systems in soft-handover.

According to a first aspect of the present invention, a mobile station has means that uses a method when operating in a packet-switched mode in a mobile communication system in which the mobile station is in communication over multiple radio links with corresponding base stations, that is characterized by determining, for a packet sent on uplinks of the multiple radio links to the corresponding base stations, whether an acknowledgement has been received on any downlink from any one of the base stations, and if so, proceeding to a new packet with a rate selected according to a rule from data rate information or signaling received from one or more of said base stations and, if not, determining if a negative acknowledgement has been received on a selected number of downlinks of the multiple radio links from the base stations and if so, proceeding with a retransmission of the packet.

In further accord with the first aspect of the invention, the mobile station and method are characterized by repeating the above-mentioned steps of determining, if a negative acknowledgement is not received from any base station or alternatively is received but not from the selected number of base stations, until acknowledgement is received, until negative acknowledgements are received from the selected number of base stations or until a timer started after sending the packet expires.

According to a second aspect of the invention, a base station has means that uses a method when operating in a packet-switched mode in a mobile communication system in which a mobile station is in communication over multiple radio links with corresponding base stations, wherein the base station checks for correct reception of incoming packets and sends an acknowledgement to the mobile station in case of correct reception and sends a negative acknowledgement otherwise, that is characterized by, prior to said check for correct reception, checking a block number of a newly-received packet, by determining if the block number is the same as a previously-received packet, by combining the newly-received packet with the previously-received packet if the block number is the same, and otherwise by storing the newly-received packet without combination.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
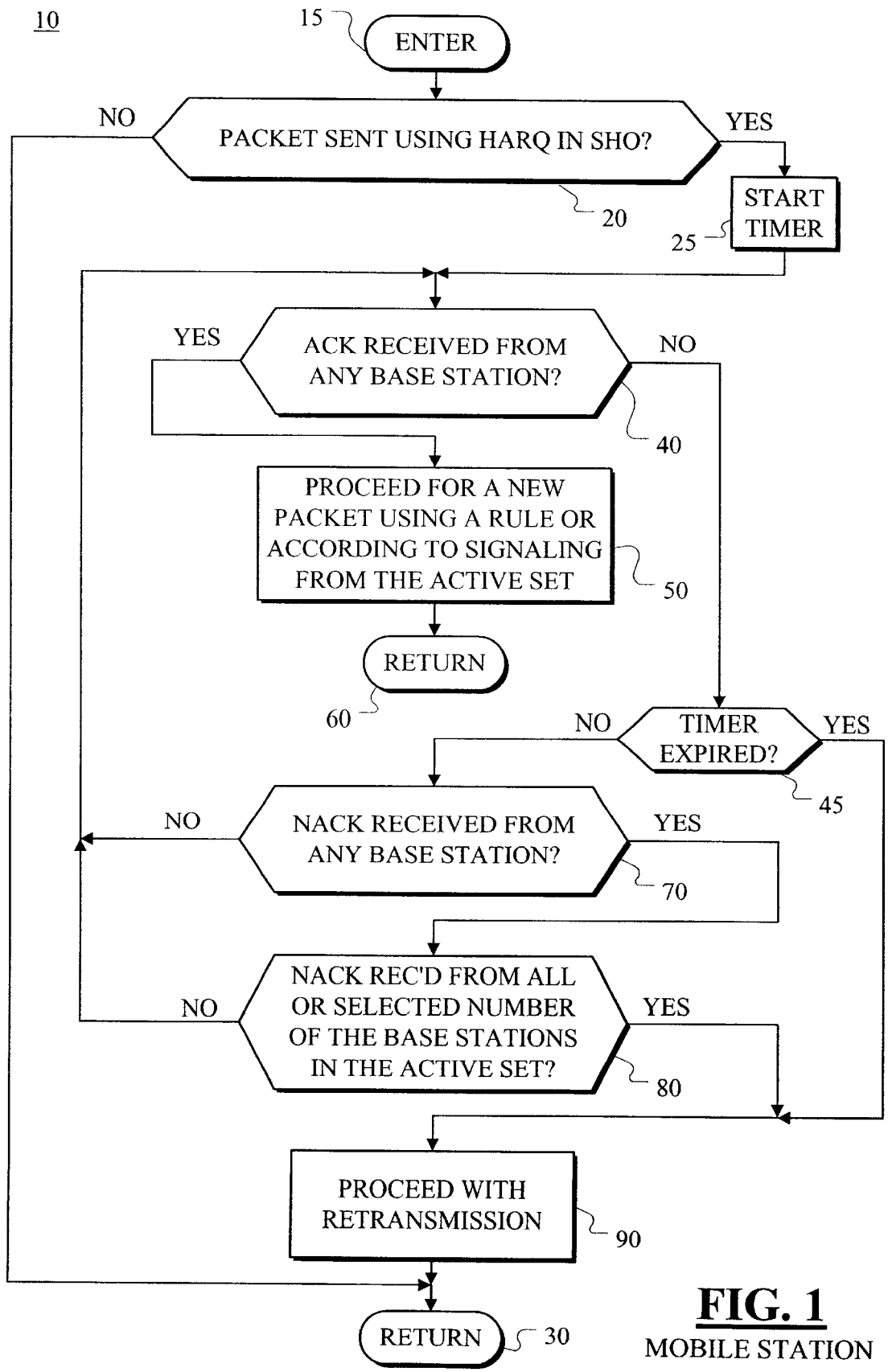
FIG. 1 shows a physical/link layer packet retransmission handling procedure for use in a mobile station in soft handover in a code division multiple access system, according to the present invention.

FIG. 1 shows a method 10 for use by a mobile station operating in a packet-switched mode in a mobile communication system, such as a code division multiple access system, in which the mobile station is in communication over multiple radio links with corresponding base stations. After entering in a step 15, a step 20 is executed to determine whether the mobile station is using hybrid automatic repeat request (HARQ) in soft handover (SHO). If not, a return is made is a step 30. If so, a retransmission timer is started in a step 25 and a step 40 is executed to determine if an acknowledgement has been received from any base station in the active set acknowledging receipt of the packet. If so, the mobile station proceeds for a new packet using a rule or according to signaling from the active set, as shown in a step 50, such as transmitting a new packet and a return is made in a step 60. This means the mobile station assumes that the network can determine the correct packet in all base stations in the active set, even though not all of the base stations have sent an acknowledgement back to the mobile station. The mobile station can then take appropriate steps to, for instance, cease storing the packet that has just been acknowledged by one of the base stations, since it is now confident that the network has received it properly.

On the other hand, if an acknowledgement has not yet been received from any base station, as determined in the step 40, a step 45 is executed to determine if the retransmission timer has expired. If not, a step 70 is then executed to find out if any negative acknowledgements have been received from any of the base stations in the active set. If not, the step 40 is re-executed. If an acknowledgement has now been received, the step 50 is executed. If not, the timer is checked again in step 45. If the step 70 had instead determines that a NACK has been received, a step 80 is executed to determine if negative acknowledgements have been received from all of the base stations in the active set or from a selected number of them. If not, the step 40 is re-executed and the timer is checked in step 45. If step 80 finds that all or the selected number of the base stations in the active set have sent negative acknowledgements, a step 90 is executed to proceed with retransmission of the packet by the mobile station, and a return is made in the step 30. If, during any of the timer checks performed in step 45, it is determined the retransmission timer has expired, the retransmission step 90 is executed directly and a return made in the step 30.

According to the procedure shown in FIG. 1, therefore, it is not necessary for the mobile station to wait for acknowledgements from all of the base stations before proceeding for a new packet. In the event that one or more of the base stations may have received the transmission correctly while others may not have, the transmission of data is not delayed by further (repeat) transmissions. The mobile station deals with the situation by assuming that if an acknowledgement is received from one base station then the network can take care of any problems in reception in all of the base stations in the active set. Only if none or only a selected number of the base stations have received the transmission correctly is there any requirement for retransmission.

As individual base stations make scheduling decisions, then e.g. two base stations can give the maximum rate to two mobiles simultaneously even when those mobiles are connected both to these two base stations, and then without rules both terminals could for instance transmit at the cell border (in SHO) at full rate. Probably both transmissions will fail. Another problem would be if one base station sets the values very low. Then the data rates could remain too low especially if the active set were large.

Therefore, according to the present invention, and referring back to step 50 of FIG. 1, in addition to the ACK/NACK from multiple base stations, there is a need to consider also the base station specific scheduling information. A rule needs to be established for choosing the best parameters among those assigned by the base stations, particularly when more than one base station in the active set are assigning such parameters independently and particularly with respect to the rate. Alternative ways for doing so are provided, for instance, according to the invention:

1. Continue transmission according to the smallest scheduler value from the values received from multiple base stations; or
2. Continue transmission according to the smallest scheduler value from the values received from multiple base stations, but consider only those that fit into certain window in terms of reliability (based on signal strength); or
3. Continue transmission according to a weighted average scheduler value from the values received from multiple base stations, with weights determined based on the base station signal strength.

The choice of the smallest scheduler value according to the first alternative relates to the fact that each base station in the active set can give scheduling information for the terminal independently (distributed scheduling). This means that e.g. when the active set size is two, then the mobile station can receive scheduling information from two base stations. One might have a good interference situation and thus allow a high data rate while the other might have a worse interference situation (higher interference level) and thus allow only a low data rate in the scheduling.

The above mentioned window according to the second alternative refers to a range of e.g. CPICH Ec/Ior differences between the base stations or any other measurement value that may be used as handover criteria. The window is relevant for the case where a base station is in the active set but the signal strength (such as CPICH Ec/Ior level) is significantly lower than the strongest base station. In the uplink direction such a base station does not receive a very good signal either as the strongest base station will dominate also the power control behavior of the mobile station's uplink transmission. Then it is advantageous to consider the scheduling information less important from the "weak" base station and either ignore it fully or to weight it with some factor. A parameter could be given with higher layer signaling as well. For example, a mobile station might receive scheduling values from two base stations as 2 Mbits/s and 100 kbits/s. It would then derive from the signal strength, based on some rule or based on higher layer signaling (or both), weight factors that the mobile station would then use to transmit with e.g. 1.5 Mbits/s. (0.7*2+0.3*0.1) Mbits/s.

The signal strength can be derived from the base station signal (CPICH=Common Pilot Channel) strength, and a bigger weight given to the base station with the greater signal strength and thus better reliability.

If the example is extended for three base stations, then for example it could be that two are determined as reliable and these two are given the weight e.g. 0.7 and one less reliable and given the weight 0.3. The calculation should be adjusted according the number of base stations in the active set so that the sum of weights remains as one (as was done in the earlier example). Thus we would have: (0.7*2 Mbits/s+0.7*2 Mbits/s+0.3*100 kbits/s)/(0.7+0.7+0.3), which would correspond to the mobile station transmitting at around 1.7 Mbits/s (assuming both strong base station indicate 2 Mbits/s and the weaker indicates 100 Kbits/s). Thus the higher layer signaling could determine the window within which base stations are considered reliable/strong and then how to weight the strong base station with respect to a weak one. An example would be to consider base stations reliable which are within 5 dB of the strongest base station CPICH strength and weight scheduling values from strong base stations with 0.6 and with 0.4 for the weak ones.

Figure 2:
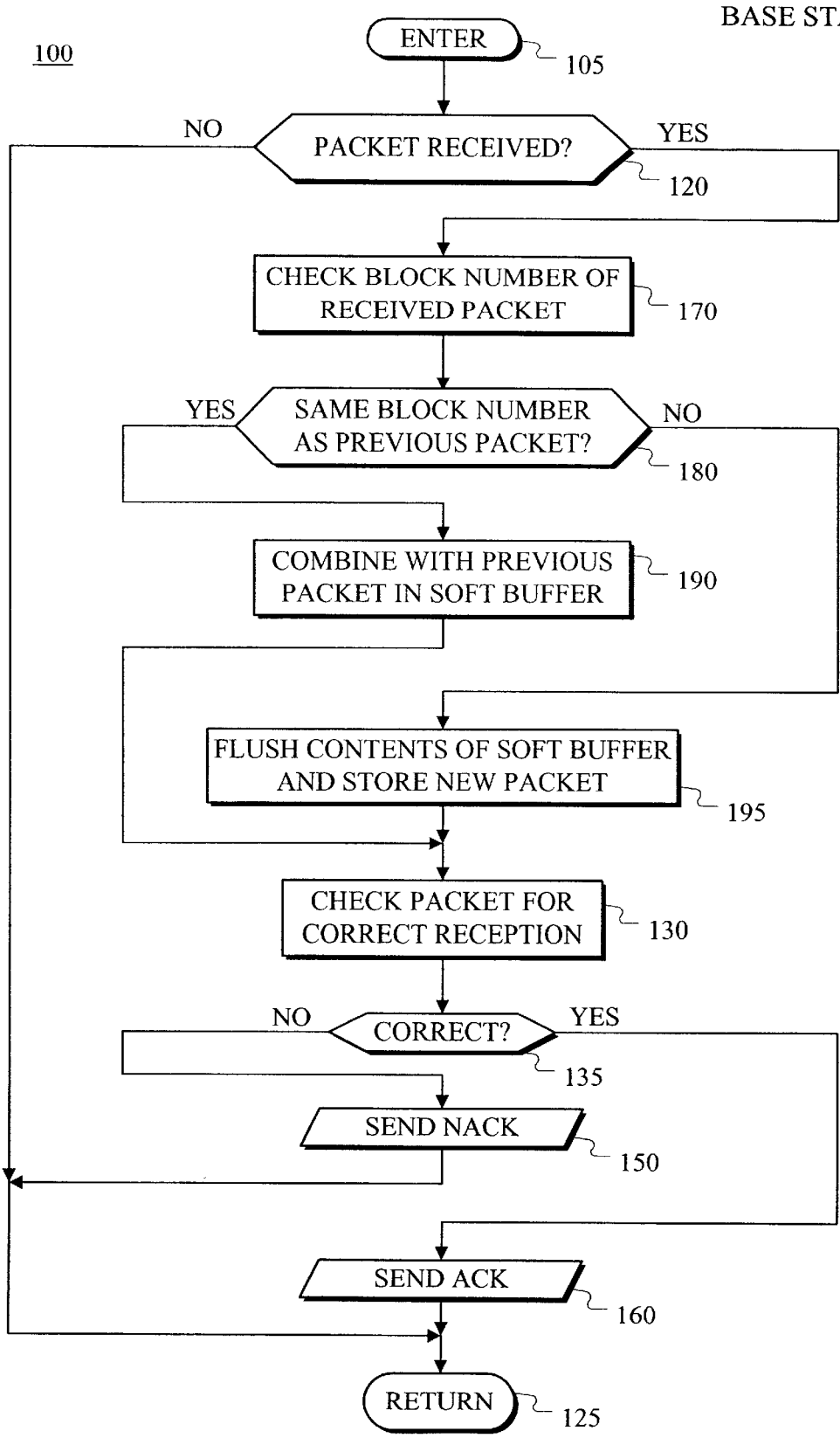
FIG. 2 shows physical/link layer packet retransmission handling for use in a base station in communication with a mobile station in soft handover in a code division multiple access system, according to the present invention.

At the base station side, as shown in FIG. 2, the physical/link layer packet retransmission handling, according to the present invention, is shown in a series of steps 100. After entering in a step 105, a step 120 is executed to determine if a packet has been received. If not, a return is made in a step 125. If a packet has been received, however, the block number of the received packet is then checked in a step 170 and compared to a block number of a previously-received packet, as shown in a step 180. Such block or sequence numbers may be provided for instance at the MAC layer as disclosed in co-pending, co-owned U.S. provisional application serial No. 60/292,023 filed May 18, 2001 entitled "HARQ scheme with in-sequence delivery of packets." If it has the same MAC block number as a previously-received packet, it is a retransmitted packet and is combined with the previous packet in a soft buffer, as shown in a step 190. If not, it is a new packet and the contents of the soft buffer are flushed, and the new packet stored therein, as shown in a step 195, followed by a step 130 to check for correct reception, e.g., by forward error correction (FEC). If not correct, as determined in a step 135, a negative acknowledgement is set in a step 150 and a return is made in the step 125. If correct, an acknowledgement is sent in the step 160 followed by a return step 125.

According to the methodology 100 shown in FIG. 2, therefore, the base station maintains a counter for ARQ channels or processes and identifies when there is a transmission for a process with a packet waiting for combining already. There will be a separate soft decision buffer for each mobile station and each HARQ process. When the base station receives a block from a given mobile station for a given HARQ process with the same block number, it combines it with the contents of the soft buffer. On the other hand, if the block number is not the same, then the base station will flush the contents of the soft buffer and store the newly-received block in the buffer. In either case, if some base station has received a block correctly, it will acknowledge it, and the mobile station will proceed with the transmission of a new block as per step 50 of FIG. 1. Other base stations will notice the new transmission from the incremented block number.

Depending on the network configuration, the indication sent at the step 150 of the failed decoding is also sent to the radio network controller. The base station common pilot indicator channel (CPICH) Ec/Ior, or the like, can be used as an additional reliability criterion for a received acknowledge message/bits.

Figure 3:
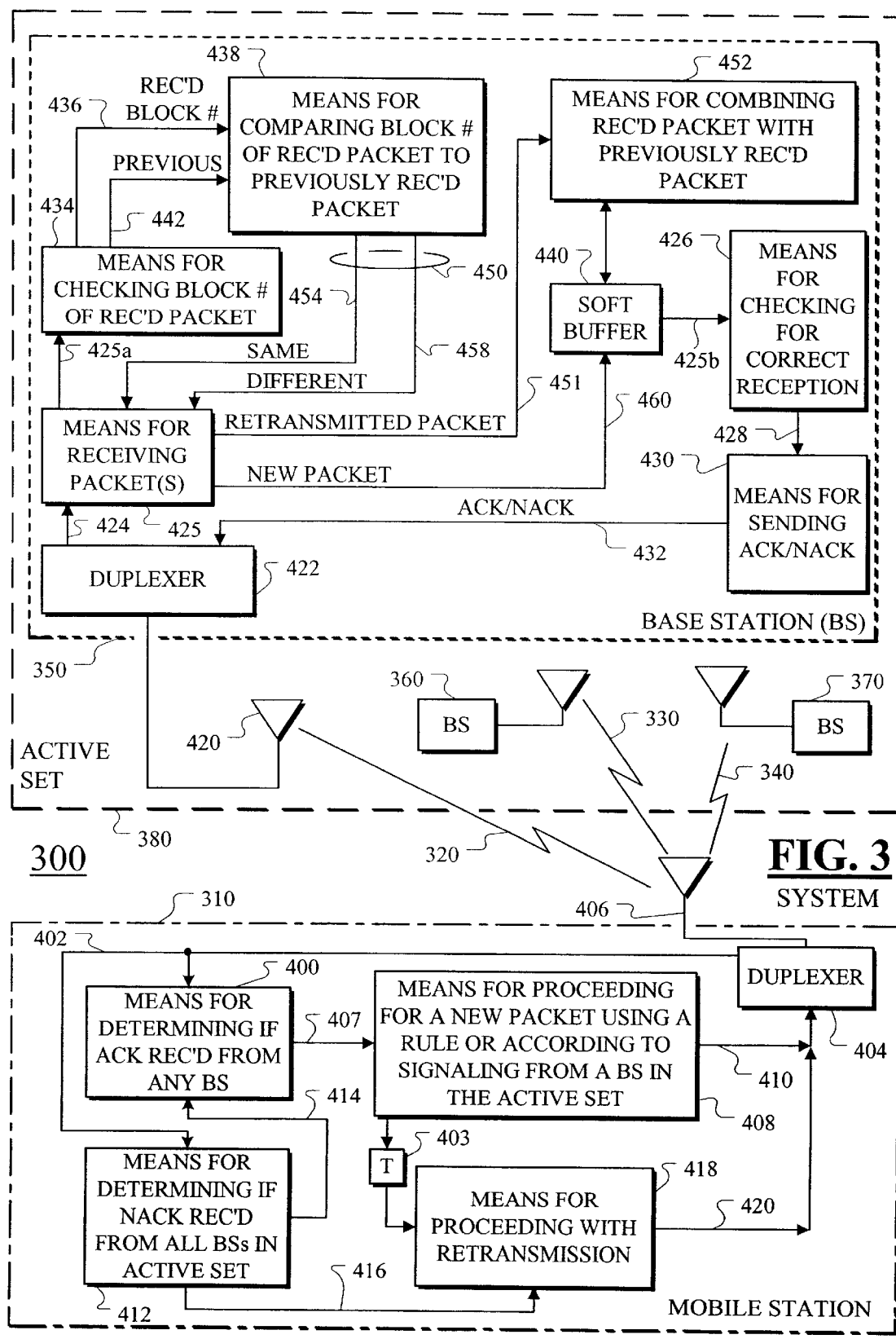
FIG. 3 shows a code division multiple access system in which a mobile station is operating in a packet-switched mode in communication over multiple radio links with corresponding base stations, according to the present invention.

FIG. 3 shows a code division multiple access system 300 in which a mobile station 310 is operating in a packet-switched mode in communication over multiple radio links 320, 330, 340 with corresponding base stations 350, 360, 370 which are part of an active set 380, according to the present invention. After transmission of a packet on uplinks of the links 320, 330, 340, the mobile station 310 stores the transmitted packet, starts a timer 403, and waits for an acknowledgement or a negative acknowledgement from one or more of the base stations of the active set 380. In this connection, the mobile station has a means 400 responsive to a signal on a line 402 from a duplexer 404 connected to an antenna 406 for receiving signals on downlinks associated with the links 320, 330, 340 (it will be realized that separate receive and transmit antennas may be used and a duplexer would not be necessary). If one of the base stations, for instance, the base station 350, sends acknowledgement of the just-transmitted packet, the means 400 for determining if acknowledgements have been received from any base station makes such a determination and sends a signal on a line 407 to a means 408 for proceeding, for instance, for transmitting a new packet on a line 410 to the duplexer 404 for transmission on the antenna 406 on uplinks of the links 320, 330, 340 to the base stations of the active set 380. In response to the signal on the line 407, the means 408 initiates transmission of a new packet with a rate selected according to a rule from data rate information or signaling received from one or more of the base stations in the active set 380. On the other hand, the mobile station also has means 412 for determining if a negative acknowledgement has been received from any, all or a selected number of the base stations in the active set before the timer expires. Another way of saying this is that the means 412 determines if a NACK has been received from all or a selected number of the base stations in the active set. If one such base station sends a negative acknowledgement, this fact is taken note of by the means 412 and may also be signaled to the means 400, as indicated on a line 414. Unlike the means 400 which will immediately proceed to cause a new packet to be transmitted even if only one base station acknowledges receipt of the previous packet, the means 412 may wait to find out if any more negative acknowledgements are incoming from the active set 380 depending on how it is set up. In particular, if all of the base stations in the active set send negative acknowledgements, the means 412 will definitely send a signal on a line 416 to means 418 for proceeding with retransmission of the packet previously stored after transmission. In such a case, a transmitted packet that has not been properly received by any base station in the active set can be retransmitted, but only after negative acknowledgements are received from all of the base stations in the active set 380. However, it is also conceivable to foresee a situation where one or more of the base stations is totally out of communication for some reason, and the means 412 should be able to send the signal on the line 416 to initiate retransmission if a selected number of negative acknowledgements are received, i.e., not necessarily from all the base stations (maybe even only one). Such could be reserved for a condition where there are known high interference conditions, for instance. The selected number need not be fixed, but could vary according to some rule.

The various base stations 350, 360, 370 of the active set 380 of FIG. 3 are illustrated in more detail with respect to the base station 350, according to the present invention. The base station is, of course, operating in the packet-switched mode, also in the code division multiple access system of FIG. 3, in which the mobile station 310 is in communication with not only the base station 350 but also the base stations 360, 370, all being part of the active set 380. Upon reception of a packet on an uplink of the link 320 via an antenna 420 and a duplexer 422, the new packet is provided on a line 424 to a means 425 for receiving and temporarily storing a new packet. Of course, separate receive and transmit antennas may be used and no duplexer. A block number of the newly received packet is provided on a line 425a to a means 434 for obtaining, checking, and providing block numbers or sequence numbers of received packets. This block number is provided on a line 436 to a means 438 for comparing the block number of the received packet to the block number of a packet previously received from the mobile station 310 and provided on a line 442 to the means 438. The block number of the previously-received packet could for instance be provided on the line 442 to the means 438 in order to enable the comparison with the block number provided on the line 436. The results of the comparison are provided on a line 450 to the means 425 or to some other equivalent means for providing the newly received packet to the soft buffer either directly or with combination. If they are the same, as indicated on a line 454, the received packet is provided on a line 451 to a means 452 for combining the received packet with the previously-received packet (in the event the block numbers are the same), and then storing the combined packets in the soft buffer. In case they are different, as indicated on a line 458, the new packet can be provided on a line 460 from the means 425 to the soft buffer 440 for storage therein. In that case, the contents of the soft buffer are entirely replaced by the new packet, i.e., the buffer is "flushed" and the new packet is then stored.

In both cases, the contents of the soft buffer are then provided on a line 425b to a means 426 for checking for correct reception thereof. This could be done by FEC, for instance. An indication is provided on a line 428 of correct or incorrect reception to a means 430 for sending an appropriate acknowledgement or negative acknowledgement on a line 432 to the duplexer 422 and the antenna 420, where the ACK or NACK is provided on a downlink of the line 320 to the mobile station 310. In this way, a criterion is defined for use in a system including a mobile station in which it is decided whether to retransmit the data or whether to send a new packet. If any of the base stations in the active set gives a positive HARQ acknowledgement in the downlink direction, then the transmission is considered successful, and a new packet is transmitted in the uplinks. This allows a short round-trip delay, as radio network controller (RNC) involvement is not needed for MAC operation. Further, the base station buffer can be cleared for a new packet when a packet with a higher (different) sequence number is sent to the same "ARQ channel" than the earlier packet with a decoding failure. As mentioned, base station CPICH Ec/Ior, etc., can be used as an additional reliability criterion for a received acknowledge message/bits.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method (10) for use by a mobile station operating in a packet-switched mode in a mobile communication system in which the mobile station is in communication over multiple radio links with corresponding base stations, characterized by determining (40), for a packet sent on uplinks of said multiple radio links to the corresponding base stations, whether an acknowledgement has been received on any downlink from any one of the base stations, and if so, proceeding (50) to a new packet with a rate selected according to a rule from data rate information or signaling received from one or more of said base stations and, if not, determining (70, 80) if a negative acknowledgement has been received on a selected number of downlinks of said multiple radio links from the base stations and if so, proceeding (90) with a retransmission of the packet.

2. The method of claim 1, characterized by repeating said steps of determining (40, 70, 80), if a negative acknowledgement is not received from any base station or alternatively is received but not from the selected number of downlinks of said multiple radio links from the base stations, until an acknowledgement is received, until negative acknowledgements are received on the selected number of downlinks, or until a timer started (25) after sending said packet expires.

3. The method of claim 1, characterized by said selected number of downlinks coming from more than one of said base stations.

4. The method of claim 1, characterized by said mobile station in soft handover and by said base stations in an active set.

5. Method (100) for use in a base station operating in a packet-switched mode in a mobile communication system in which a mobile station operating according to claim 1 is in communication over multiple radio links with corresponding base stations, wherein said base station checks (130) for correct reception of incoming packets and sends an acknowledgement (160) to the mobile station in case of correct reception and sends (150) a negative acknowledgement otherwise, further characterized by, prior to said check (130) for correct reception, checking (170) a block number of a received packet, by determining (180) if the block number is the same as a previously-received packet, by combining (190) the received packet with the previously-received packet if the block number is the same, and otherwise by storing the newly-received packet without combination.

6. Method (10, 100) for use in a mobile communication system in which a mobile station operating in a packet-switched mode is in communication over multiple radio links with corresponding base stations, characterized by determining (40) in the mobile station, for a packet sent on multiple uplinks of said multiple radio links to the corresponding base stations, whether an acknowledgement has been received on any one of multiple downlinks of said multiple radio links from any one of the base stations, and if so, proceeding (50) to a new packet with a rate selected according to a rule from data rate information or signaling received from one or more of said base stations and, if not, determining (70) in the mobile station if a negative acknowledgement has been received on downlinks of all said multiple radio links from all the base stations and if so, retransmitting (90) said packet, and if a negative acknowledgement has not been received from all the base stations, repeating said steps of determining (40, 70) until an acknowledgement is received or until negative acknowledgements are received from all the base stations, by checking (170) in each base station a block number of a received packet, by determining (180) if the block number is the same as a previously-received packet, by combining (190) the received packet with the previously-received packet if the block number is the same, and otherwise by storing the new, received packet, and by checking (130) in each base station for correct reception of received packets, by sending (160) an acknowledgement to the mobile station in case of correct reception, or by sending (150) a negative acknowledgement in case of incorrect reception.

7. A mobile station (310) operating in a packet-switched mode in a mobile communication system (300), in which the mobile station is in communication over multiple radio links (320, 330, 340) with corresponding base stations (350, 360, 370), characterized by means (400) for determining, for a packet sent on uplinks of said multiple radio links to the corresponding base stations, whether an acknowledgement has been received on any downlink from any one of the base stations and if so, providing a signal (407) for initiating the transmission of a new packet with a rate selected according to a rule from data rate information or signaling received from one or more of said base stations; and means (412) for determining if a negative acknowledgement has been received from a selected number of downlinks of said multiple radio links from the base stations and if so, providing a signal (416) for initiating retransmission of the packet.

8. The mobile station of claim 7, further comprising a timer (403) for timing a period after said packet is sent on said uplinks and for initiating said retransmission after a selected period without any acknowledgement received from said any one of the base stations.

9. Base station (350) operating in a packet-switched mode in a mobile communication system (300) in which a mobile station (310) according to claim 7 is in communication over multiple radio links (320, 330, 340) with corresponding base stations (350, 360, 370), wherein said base station comprises means (426) for checking for correct reception of incoming packets;

means (430) for sending an acknowledgement to the mobile station in case of correct reception and for sending a negative acknowledgement otherwise;

means (438) for determining if a sequence number is the same as a previously-received packet;

means (452) for combining the received packet with the previously-received packet if the block number is the same; and means (440) for storing the received packet with or without combination with said previously-received packet.

10. A computer program for storage on a computer-readable medium in the mobile station of claim 1 for carrying out the steps of claim 1.

11. A computer program for storage on a computer-readable medium in the base station of claim 5 for carrying out the steps of claim 5.

* * * * *